United States Patent [19]

Reneau et al.

[11] Patent Number: 4,986,220
[45] Date of Patent: Jan. 22, 1991

[54] GAME FEEDER AND IMPROVED DISTRIBUTOR

[76] Inventors: Charles F. Reneau, 2124 Marnel, Houston, Tex. 77055; E. Ray Brumley, Rte. 3, Box 283, Huntsville, Tex. 77340

[21] Appl. No.: 506,942

[22] Filed: Apr. 10, 1990

[51] Int. Cl.⁵ ............................................. A01K 39/01
[52] U.S. Cl. ................................................. 119/57.91
[58] Field of Search ............... 119/51.11, 51.01, 57.91, 119/57.92; 239/668, 673, 681, 683, 684, 687, 688; 222/491, 410

[56] References Cited

U.S. PATENT DOCUMENTS

| | | | |
|---|---|---|---|
| 396,251 | 1/1889 | Adamson | 239/688 |
| 3,170,264 | 2/1965 | Waldrum | 239/681 |
| 3,698,574 | 10/1972 | Louks | 239/687 X |
| 4,167,248 | 9/1979 | Akazawa et al. | 239/683 |
| 4,470,522 | 9/1984 | Cents et al. | 220/410 X |
| 4,497,446 | 2/1985 | van der Lely et al. | 239/687 X |

FOREIGN PATENT DOCUMENTS

| | | | |
|---|---|---|---|
| 345992 | 3/1931 | United Kingdom | 239/687 |
| 1594447 | 7/1981 | United Kingdom | 119/51.04 |
| 2075322 | 11/1981 | United Kingdom | 239/687 |

Primary Examiner—Gene Mancene
Assistant Examiner—R. Thomas Price
Attorney, Agent, or Firm—G. Turner Moller

[57] ABSTRACT

A game feeder includes a feed container having a funnel shaped outlet immediately above a distributor mounted for rotation on the end of a motor shaft. When the motor runs, the plate spins and broadcasts feed around the feeder. The distributor includes an inlet having a member extending across the path of movement of feed from the container outlet toward the distributor. When the distributor turns, any trash extending down from the container outlet is cut or abraded by the spinning member. The distributor includes one or more outlets having a swinging gate providing a closure for the outlet in a stopped or resting condition of the motor and preventing movement of feed unless the motor is running. When the motor turns and the distributor spins, the gate opens by centrifugal force allowing feed to pass through the distributor outlet.

15 Claims, 1 Drawing Sheet

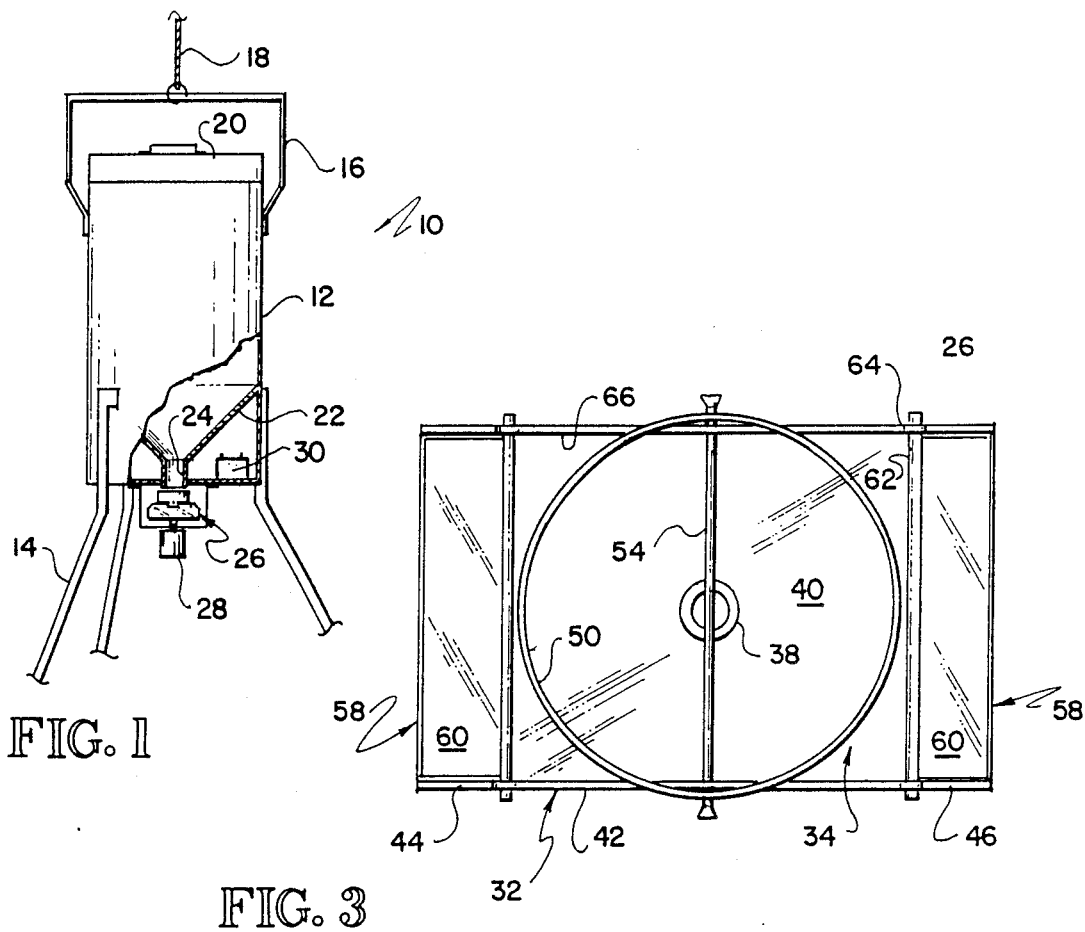
FIG. 1
FIG. 3
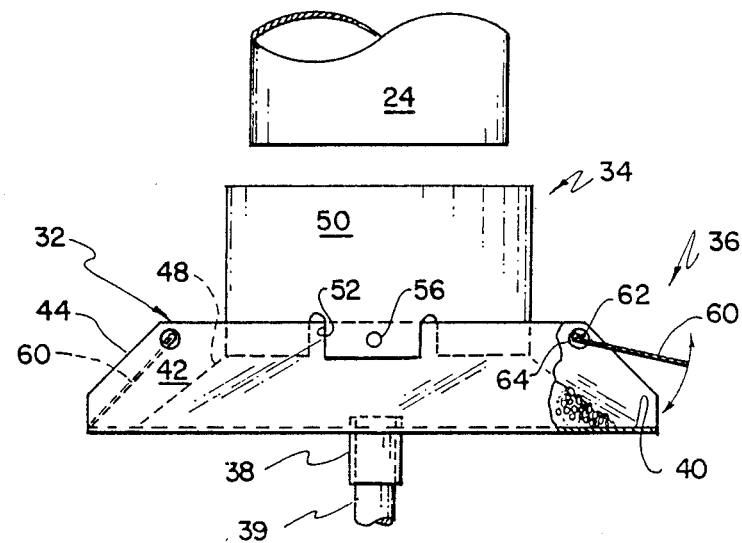
FIG. 2

GAME FEEDER AND IMPROVED DISTRIBUTOR

This invention relates to a game feeder and more particularly to a game feeder with an improved feed distributor.

Game feeders are well known in the art to distribute corn or other feed grains to attract and retain game animals, such as deer or turkey. Although game feeders are of many different type, one common type feeder incorporates a feed container having a downwardly facing outlet opening, an electric motor for spinning a distributor located directly under the feed container outlet and means for periodically energizing the motor to broadcast feed onto the ground adjacent the device. A popular feeder of this type is shown in U.S. Pat. No. 3,195,508. Other similar devices are found in U.S. Pat. Nos. 321,703; 1,239,404; 1,355,399; 2,723,860 and 4,580,730.

All distributor plates used today include a flat plate of any suitable shape, such as square, round, hexagonal or the like. Some have two or more outer edges which are turned up at right angles. Most, however, are a round, flat plate with two or more small L-shaped vanes or beaters to propel the feed outwardly and away from the container. The best designs add an annular top plate above and attached to the vanes to force the feed outwardly in a more-or-less horizontal plane so the feed is not "batted" upwardly to ricochet off the bottom of the feed container, which is a common problem with flat distributor plates.

One of the peculiarities of game feeders is there is no gate or valve at the bottom of the feed container. The outlet of the feed container is a funnel shaped affair in which the bottom end is closely adjacent the distributor and concentric about the distributor rotational axis. When the motor turns, feed on the distributor is centrifugally thrown outwardly and replaced by grain falling from the container. Feed is broadcast as long as the distributor is spun. The feed container outlet is close to the distributor and small when compared to it so feed does not run off the side of the distributor when it is stopped, i.e. the angle of repose of the granular feed is such that feed does not run off the side of the distributor when it is stopped. When the motor stops, the natural resistance of the feed to movement effectively clogs up the distributor thereby stopping the gravity flow of feed from the container. This is a clever alternative to the trouble and expense of a movable gate which must be powered in some way.

There are a variety of problems with prior art game feeders. A common problem is that small birds and small agile animals such as squirrels and raccoons learn to feed directly off the distributor plate when the motor is stopped, despite the fact that the feed container and distributor plate are elevated substantially off the ground. When feed is taken off the distributor plate, more feed falls out of the container onto the plate. Thus, a large proportion of the feed can be consumed by birds or animals which the user does not wish to feed. Similarly, high winds can shake the feeder so feed falls off the distributor thereby allowing feed from the container to spill out onto the distributor. Other problems include trash, such as corn cob pieces, corn stalk, leaves and the like dropping out of the feed container outlet opening and coming to rest on the distributor plate. This clogs the outlet opening and reduces the amount of feed broadcast by the device. In an aggravated situation, trash clogging the outlet opening can prevent grain from falling out of the container onto the distributor.

The game feeder of this invention and more particularly the improved distributor of this invention overcomes many of these problems. The distributor includes an inlet facing the discharge opening of the feed container and one or more outlet openings having a swinging gate which, in a resting position, closes the outlet opening. When the distributor is spun by the feeder motor, the gate swings to a position away from the outlet opening thereby allowing feed to discharge from the distributor. When the motor is stopped, the gate closes the outlet opening and thereby substantially prevents undesired birds or animals from eating directly off the distributor and substantially prevents wind or vibration from shaking feed off the distributor. Means are provided in the distributor to abrade trash collecting in the distributor inlet thereby reducing the trash to a size which passes through the distributor.

In summary, one aspect of this invention comprises a game feeder including a feed container having a downwardly facing outlet and a distributor including inlet structure providing an upwardly facing inlet opening in feed receiving relation with the container outlet, outlet structure providing at least one laterally facing outlet opening in feed receiving relation with the distributor inlet opening, a motor having a rotary output shaft connected to the distributor for spinning the distributor about an upright axis and broadcasting feed around the feeder, a gate and means mounting the gate on the distributor for movement between a normally closed first position obstructing the distributor outlet opening in a stopped condition of the motor to a second open position allowing feed movement through the distributor outlet opening in response to spinning movement of the distributor.

In summary, another aspect of this invention comprises a game feeder including a feed container having a downwardly facing outlet and a rotatably mounted distributor including inlet structure providing an upwardly facing inlet sleeve in feed receiving relation with the container outlet, outlet structure providing at least one laterally facing outlet opening in feed receiving relation with the distributor inlet opening, a motor having a rotary output shaft connected to the distributor for spinning the distributor about an upright axis and broadcasting feed around the feeder, and means in the inlet sleeve for abrading an elongate member extending downwardly from the container outlet into the sleeve.

It is an object of this invention to provide an improved game feeder and more particularly to provide an improved distributor for a game feeder.

A more specific object of this invention is to provide a distributor for a game feeder having a swinging gate obstructing the distributor outlet in a position of rest.

Other objects and advantages of this invention will become more fully apparent as this description proceeds, reference being made to the accompanying drawings and appended claims.

IN THE DRAWINGS

FIG. 1 is a side elevational view, partly in section and partly broken, of a game feeder equipped with the improved distributor of this invention;

FIG. 2 is an enlarged side elevational view of the distributor of this invention and its position relative to the downspout of the game feeder; and FIG. 3 is a top view of the distributor of FIG. 2.

Referring to FIGS. 1-3, a game feeder 10 comprises a feed container 12 having either a stand 14 for supporting the feeder 10 from the ground and/or a bail 16 and rope 18 for supporting the feeder 10 from a tree. The container 12 provides an open top closed by a lid 20 and an outlet structure including a funnel shaped bottom wall 22 terminating in an open downspout 24. A distributor 26 of this invention is located immediately under the spout 24 and is rotated by an electric motor 28 powered by a battery 30 in any suitable manner. Suitable controls are provided for energizing the motor 28 at periodic intervals as will be appreciated by those skilled in the art.

The distributor 26 is positioned immediately below the downspout 24 as shown best in FIG. 2 and comprises a generally channel shaped body 32, inlet structure 34, outlet structure 36 and a connection 38 to the shaft 39 of the electric motor 28. The body 32 is conveniently of stamped sheet metal having a bottom wall 40 and a pair of upright side walls 42 providing inclined ends 44, 46. Grain passing through the spout 24 thus falls onto the bottom wall 40 and collects in a pile 48 in accordance with the angle of repose of the particular feed involved.

The inlet structure 34 is a simple sleeve 50 shown slightly larger than the downspout 24 although they may be of the same size. The sleeve 50 is rigidly connected to the distributor body 32 in any suitable manner. One suitable technique provides a pair of notches 52 on the bottom edge of the sleeve 50 so the sleeve 50 straddles the side walls 42. One or more connecting pins 54 extends through the side walls 42 and is either press fit in an opening 56 in the side walls 42 or has a bent or upset end. Thus, the notches 52 keep the sleeve 50 from canting out of alignment with the downspout 24 and the pin 54 attaches the sleeve 50 to the body 32. As seen in FIG. 3, the connecting pin 54 extends into and preferably substantially across the sleeve 50 for purposes more fully explained hereinafter.

The outlet structure 36 of the distributor 26 comprises the open ends of the distributor body 32 and a pair of swinging gates 58 mounted on the body 28 for free swinging movement between a first inclined closed position abutting the bottom wall 40 and a second generally horizontal open position shown in FIG. 2. When the motor 28 and distributor 26 are at rest, the gates 58 fall by gravity against the bottom wall 40 and effectively close the ends of the body 32. When the motor 28 spins the distributor 26, the gates 58 move in response to centrifugal force to the position shown in FIG. 2 allowing grain in the pile 48 to discharge laterally of the feeder 10.

The gates 58 accordingly comprise a generally flat plate 60 fixed to a shaft 62 loosely received in aligned openings 64 in the side walls 42. The shafts 62 are slightly longer than the distance between the side walls 42 and are bent slightly during assembly. When the shafts 62 are in the openings 64 and straighten out, they are slightly too long to be easily removed.

Operation of the distributor 26 should now be apparent. When the motor 28 is at rest, feed from the container 12 falls through the downspout 24 and sleeve 50 to collect in the pile 48 on the distributor bottom wall 40. The gates 58 are closed by gravity against the bottom wall 40 and prevent a bird or small animal from eating directly off the distributor 26. When the motor 28 is started, the distributor 26 spins and the gates 58 move to the horizontal position shown in FIG. 2 allowing feed to be broadcast laterally of the feeder 10.

If a stalk, corn cob or other piece of large elongate trash falls into the downspout 24 and comes to rest on the bottom wall 40, rotation of the distributor 26 causes the pin 54 to rotate through the trash and cut or abrade it into pieces that are small enough to pass through the distributor 26. It will be apparent that the trash is held more-or-less stationary by feed packed around it in the downspout 24 while the pin 54 acts as a blade to cut it into small pieces.

The top of the distributor 26 is open, i.e. there is preferably no material in the corners 66 between the circular sleeve 50 and the square opening defined by the side walls 42 and gate plates 60 as seen in FIG. 3. This might be thought to be disadvantageous because it could conceivably allow feed to be "batted" upwardly against the bottom of the feed container and/or allow birds or small animals access to the feed. This has turned out not to be the case. The corners 66 are so small that no appreciable amount of feed is batted upwardly. The corners 66 are so close to the underside of the feed container 12 that birds or small animals cannot reach them. If this were perceived to be a problem, the corners 66 could be closed or the sleeve 50 made of rectangular stock.

Although this invention has been disclosed and described in its preferred forms with a certain degree of particularity, it is understood that the present disclosure of the preferred forms is only by way of example and that numerous changes in the details of operation and in the combination and arrangement of parts may be resorted to without departing from the spirit and scope of the invention as hereinafter claimed.

I claim:

1. A game feeder comprising
   a feed container having an outlet; and
   a distributor including
      inlet structure providing an inlet opening in feed receiving relation with the container outlet;
      outlet structure providing at least one laterally facing outlet opening in feed receiving relation with the distributor inlet opening;
   a motor having a rotary output shaft connected to the distributor for spinning the distributor about a first upright axis and centrifugally broadcasting feed around the feeder; and
   a gate and means mounting the gate on the distributor for free swinging rotary movement about a second axis transverse to the first axis between a normally closed first position obstructing the distributor outlet opening in a stopped condition of the motor to a second open position allowing feed movement through the distributor outlet opening in response to spinning movement of the distributor.

2. The game feeder of claim 1 wherein the feed container outlet faces downwardly and the distributor inlet opening faces upwardly.

3. The game feeder of claim 2 wherein the distributor inlet structure is juxtaposed to the container outlet and includes an upwardly extending sleeve under the container outlet and a member extending into the sleeve and rotatable with the distributor for abrading an elongate member extending downwardly from the container outlet into the sleeve.

4. The game feeder of claim 3 wherein the member extending into the sleeve extends substantially across the sleeve.

5. The game feeder of claim 2 wherein
the distributor includes a channel shaped body having a horizontal bottom wall facing toward the container outlet and a pair of upright walls each providing a pair of ends having a pair of horizontally aligned openings extending across the distributor,
the inlet structure includes a sleeve connected to the upright walls having an upper end adjacent the container outlet and a lower end spaced from the bottom wall,
the gates including a closure plate sized to span between the ends of the upright walls, and
the gate mounting means including a shaft spanning across the upright channel walls and received in the aligned openings.

6. The game feeder of claim 5 wherein the sleeve is generally cylindrical having an outside diameter greater than the distance between the pair of upright walls, an inside diameter substantially the same as the distance between the pair of upright walls and a notched lower end spanning the upright walls.

7. The game feeder of claim 6 further comprising a member extending across the sleeve and connecting the sleeve to the upright walls, the member rotating relative to the feed container outlet and abrading elongate trash extending downwardly through the container outlet onto the distributor body.

8. The game feeder of claim 1 wherein the second axis is generally horizontal and the gate mounting means comprises means mounting the gate for movement between a downwardly directed attitude in the closed position to a generally horizontal attitude in the open position.

9. A broadcasting distributor comprising
inlet structure providing an upwardly facing inlet opening in feed receiving relation with a container outlet;
outlet structure providing at least one laterally facing outlet opening in feed receiving relation with the distributor inlet opening;
means for attachment to a motor output shaft for spinning the distributor about an upright axis and broadcasting material around the distributor; and
a gate and means mounting the gage on the distributor for free swinging rotary movement about a generally horizontal axis transverse to the upright motor axis between a normally closed first position obstructing the distributor outlet opening in a stopped condition of the motor to a second open position allowing material movement through the distributor outlet opening in response to spinning movement of the distributor.

10. The game feeder of claim 9 wherein the distributor inlet structure includes an upwardly extending sleeve and a member extending into the sleeve and rotatable with the distributor for abrading an elongate member extending downwardly from the container outlet into the sleeve.

11. The game feeder of claim 10 wherein the member extending into the sleeve extends substantially across the sleeve.

12. The game feeder of claim 9 wherein
the distributor includes a channel shaped body having a horizontal bottom wall facing toward the container outlet and a pair of upright walls each providing a pair of ends having a pair of horizontally aligned openings extending across the distributor,
the inlet structure includes a sleeve connected to the upright walls having an upper end adjacent the container outlet and a lower end spaced from the bottom wall,
the gates including a closure plate sized to span between the ends of the upright walls, and
the gate mounting means including a shaft spanning across the upright channel walls and received in the aligned openings.

13. The game feeder of claim 12 wherein the sleeve is generally cylindrical having an outside diameter greater than the distance between the pair of upright walls, an inside diameter substantially the same as the distance between the pair of upright walls and a notched lower end spanning the upright walls.

14. The game feeder of claim 13 further comprising a member extending across the sleeve and connecting the sleeve to the upright walls, the member rotating relative to the container outlet and abrading elongate trash extending downwardly through the container outlet onto the distributor body.

15. The game feeder of claim 9 wherein the gate mounting means comprises means mounting the gate for movement between a downwardly directed attitude in the closed position to a generally horizontal attitude in the open position.

* * * * *